US012459733B2

(12) United States Patent
Chatain et al.

(10) Patent No.: US 12,459,733 B2
(45) Date of Patent: Nov. 4, 2025

(54) BIN STORAGE SYSTEM WITH ROBOTS RUNNING ON COVERS

(71) Applicant: EXOTEC PRODUCT FRANCE, Croix (FR)

(72) Inventors: Marc Chatain, Zimmerbach (FR); Romain Moulin, Lille (FR); Renaud Heitz, Villeneuve d'Ascq (FR)

(73) Assignee: EXOTEC PRODUCT FRANCE, Croix (FR)

( * ) Notice: Subject to any disclaimer, the term of this patent is extended or adjusted under 35 U.S.C. 154(b) by 373 days.

(21) Appl. No.: 18/042,533

(22) PCT Filed: Aug. 31, 2021

(86) PCT No.: PCT/EP2021/073970
§ 371 (c)(1),
(2) Date: Feb. 22, 2023

(87) PCT Pub. No.: WO2022/043572
PCT Pub. Date: Mar. 3, 2022

(65) Prior Publication Data
US 2023/0331477 A1    Oct. 19, 2023

(30) Foreign Application Priority Data
Aug. 31, 2020  (FR) ..................... 2008856

(51) Int. Cl.
*B65G 1/04*    (2006.01)
*B66F 19/00*   (2006.01)

(52) U.S. Cl.
CPC ......... *B65G 1/0464* (2013.01); *B65G 1/0492* (2013.01); *B66F 19/00* (2013.01)

(58) Field of Classification Search
CPC .................................................. B65G 1/0464
See application file for complete search history.

(56) References Cited

U.S. PATENT DOCUMENTS 2,165,513 A * 7/1939 Smith ..................... F25D 13/02
                                                                    62/331
4,088,232 A * 5/1978 Lilly .................... B65G 1/0464
                                                                    414/282

(Continued)

FOREIGN PATENT DOCUMENTS

CN    102067186 A    5/2011
CN    106364826 A    2/2017

(Continued)

OTHER PUBLICATIONS

International Search Report dated Dec. 14, 2021 for corresponding International Application No. PCT/EP2021/073970, filed Aug. 31, 2021.

(Continued)

*Primary Examiner* — Mark C Hageman
(74) *Attorney, Agent, or Firm* — David D. Brush; Westman, Champlin & Koehler, P.A.

(57) ABSTRACT

A bin storage system includes a plurality of storage columns configured to receive a stack of bins. Upper contours of the storage columns form a grid. At least one robot operates above the grid, which is capable of picking up, transporting and depositing bins. The robot includes elements for gripping and lifting at least one bin. A plurality of removable covers above the grid form a circulation platform for the robot. The robot includes elements for pushing, pulling and/or lifting the covers to change the position of the covers to free access to the upper part of the columns.

30 Claims, 6 Drawing Sheets

(56) References Cited

U.S. PATENT DOCUMENTS

| | | | |
|---|---|---|---|
| 9,151,770 B2* | 10/2015 | Reuteler | ............ G01N 35/0099 |
| 10,018,397 B2* | 7/2018 | Hognaland | .............. B65G 1/02 |
| 2011/0101018 A1 | 5/2011 | Shafir | |
| 2018/0128532 A1 | 5/2018 | Hognaland | |

FOREIGN PATENT DOCUMENTS

| | | | |
|---|---|---|---|
| NO | 317366 B1 | 10/2004 |
| WO | 2019001816 A1 | 1/2019 |
| WO | 2019081092 A1 | 5/2019 |

OTHER PUBLICATIONS

Written Opinion of the International Searching Authority dated Dec. 14, 2021 for corresponding International Application No. PCT/EP2021/073970, filed Aug. 31, 2021.

English translation of the Written Opinion of the International Searching Authority dated Dec. 14, 2021 for corresponding International Application No. PCT/EP2021/073970, filed Aug. 31, 2021.

Chinese Office Action and Search Report dated Jun. 16, 2025 for corresponding Chinese Application No. 202180053232.1.

* cited by examiner

BIN STORAGE SYSTEM WITH ROBOTS RUNNING ON COVERS

CROSS-REFERENCE TO RELATED APPLICATIONS

This application is a Section 371 National Stage Application of International Application No. PCT/EP2021/073970, filed Aug. 31, 2021, the content of which is incorporated herein by reference in its entirety, and published as WO 2022/043572 on Mar. 3, 2022, not in English.

1. FIELD OF THE INVENTION

The field of the invention is that of warehouse logistics, and in particular the automatic storage and retrieval of products.

More specifically, the invention relates to a system for storing bins stacked in columns.

The invention has particular application in the storage of foodstuffs at controlled temperatures, for example in a refrigerated or frozen environment.

2. STATE OF THE ART

Automated structures for storing bins containing products in a three-dimensional grid are known, for example from document NO317366 B1, in which the bins are stored on top of each other in columns to which rails have been attached to allow the movement of robots to pick up or drop off one or more bins in a column and transport them on the grid-like rail network to another storage column or collection point, where for example the bins are transferred onto a conveyor or into a lift.

To ensure the storage of fresh or frozen food products, it has been suggested, for example in US2018/0128532 A1, to create temperature-controlled storage areas, grouping together several columns in which the temperature is maintained respectively at positive cold or a temperature of approximately −18° C. This area is thermally insulated around its perimeter and covers made of insulating material are placed on each of the columns of the temperature-controlled storage area between the robot circulation rails.

A shortcoming of this known technique is the handling of the covers. The covers must be removed and placed on top of other covers to gain access to the bins stored in a temperature-controlled column, and then replaced between the rails above the column, or dedicated robots must be used to handle the covers while another robot picks up or places bins in a temperature-controlled column. As a result, these techniques are complex to implement and costly. In addition, the different handling of the covers increases the time needed to remove a bin from the storage structure.

In addition, the products in the bins become warm during the numerous manipulations of the covers, which is undesirable.

In order to reduce the exposure time of the products to the ambient temperature of the warehouse, it was thought to also maintain a controlled temperature in the circulation area of the robots, above the storage columns of a temperature controlled area.

A shortcoming of this known technique is that condensation can occur on the electronic circuits of the robots when they move from one area to another area with a different temperature, which can damage them or hinder their proper functioning.

In order to overcome this shortcoming, it was suggested in WO2019/001816 A1 to partition the different temperature zones and to use a lift to transport bins from one zone to another.

A shortcoming of this technique is that it is expensive and complex to implement.

3. SUMMARY

An exemplary embodiment of the present disclosure relates to a bin storage system comprising a plurality of storage columns of substantially rectangular cross-section, said columns being configured to receive a vertical stack of bins, the upper contours of said storage columns forming a grid, and at least one robot operating above said grid, capable of picking up, transporting and depositing bins, said robot comprising means for gripping and lifting at least one bin and being equipped with wheels.

According to the invention, such a system comprises a plurality of removable covers above said grid, said covers being substantially contiguous with the covers adjacent thereto and extending substantially over the entire surface of a cell of said grid and said covers forming a traffic platform for said robot, and said robot has means for pushing, pulling and/or lifting said covers to change the position of said covers to free access to the upper part of said columns.

Thus, in a novel way, the invention proposes to use covers to form a rolling surface for the robots, on which the robots can move freely in all directions or along predefined paths, for example by running in guides formed in the covers, which limits infrastructure costs, and in the case where the robots can move freely, allows greater mobility and significantly increases the speed of movement of the robots between two distant positions on the grid.

It should be noted that the covers can be tilted vertically, pushed or pulled substantially horizontally to slide over or under other covers, or lifted by the robot to provide access to the columns, without going beyond the scope of the invention.

Furthermore, the term "removable" is used in the context of the invention in its general sense, i.e. the cover can be moved, either translationally or rotationally, or a combination of both.

In an advantageous embodiment of the invention, each of said covers is pivotally mounted along a horizontal axis between a horizontal position in which it closes off the top of a column and a vertical position in which access to the top of the column is released, and said pushing, pulling and/or lifting means are adapted to push a free end of a cover to cause it to tilt upwards.

Thus, by pivotally mounting covers, the robots can easily access the bins stored in the columns below them by tilting them upwards by simply pushing or pulling on their free end.

In a variation of this particular embodiment of the invention, said means for pushing, pulling and/or lifting said covers comprise a member projecting from the chassis of said robot for engaging the underside of the cover and pushing it to pivot upwards to said vertical position.

In a particular embodiment of the invention, said covers are pivotally mounted along two parallel horizontal axes extending substantially at two opposite edges of said cover.

This allows the covers to move to one side or the other, allowing the robots to approach the covers from either side, which can reduce the distance the robots travel and free up a path for another robot to move through.

In a particular embodiment of the invention, at least one of said covers is slidably mounted between a first position in which it closes off the top of a column and a second position, in which said cover is housed under a cover adjacent thereto in said first position, thereby freeing access to the top of that column.

In a particular embodiment of the invention, said sliding cover has first and second pairs of laterally projecting fingers and comprises a first pair of finger guiding slides of said first pair of fingers extending on opposite edges of the column closed by said sliding cover in said first position and a second pair of finger guiding slides of said second pair of fingers extending on opposite edges of an adjacent column of said column closed by said sliding cover in said first position, located in the extension of said first pair of slides.

In an advantageous embodiment of the invention, said covers have a layer of thermal insulation and said storage columns under said covers are temperature controlled volumes.

The storage system allows products to be stored in all or part of its volume at one or more controlled temperatures, while avoiding frigorie loss.

In a particular embodiment of the invention, at least two of said storage columns are at different controlled temperatures.

This means that positive cold products, frozen products and products at room temperature in the warehouse, for example, can be stored in the same system.

According to a particular aspect of the invention, said means for pulling and/or pushing a free end of a cover comprise a finger adapted to cooperate with a housing formed in one of said covers.

Preferably, said robot has at least two driving wheels.

In a particular embodiment of the invention, said robot has three or four driving wheels.

According to an advantageous embodiment of the invention, said means for gripping and lifting at least one container comprise a frame capable of sliding around said bins, equipped with means of attachment to a container and means of vertical displacement of said frame under the chassis of said robot.

In the context of the invention, the term "frame" means a device, such as a chassis, for enclosing a container on at least three sides.

In a particular embodiment of the invention, said fastening means comprise hooks or claws.

In a particular embodiment of the invention, a system as described above comprises at least one column for depositing said bins and means for removing said bins from said deposit column.

This means that the robots can easily return the stored bins.

In a particular embodiment of the invention, a first pair and a second pair of parallel rails or guiding slides are formed in the upper portion of said bonnet, the rails or guiding slides of said second pair of parallel rails or guiding slides being perpendicular to the rails or guiding slides of said first pair, and in that said robot is equipped with wheels suitable for running on rails or guiding slides and runs on either of said pairs of rails or guiding slides.

Thus, by building the guiding slides directly into the covers, the costs of implementing the storage system are reduced.

4. LIST OF FIGURES

Other features and advantages of the invention will become clearer from the following description of two embodiments of the invention, given merely as illustrative and non-limiting examples, and of the appended drawings, of which:

5. DETAILED DESCRIPTION OF THE INVENTION

Figure 1:
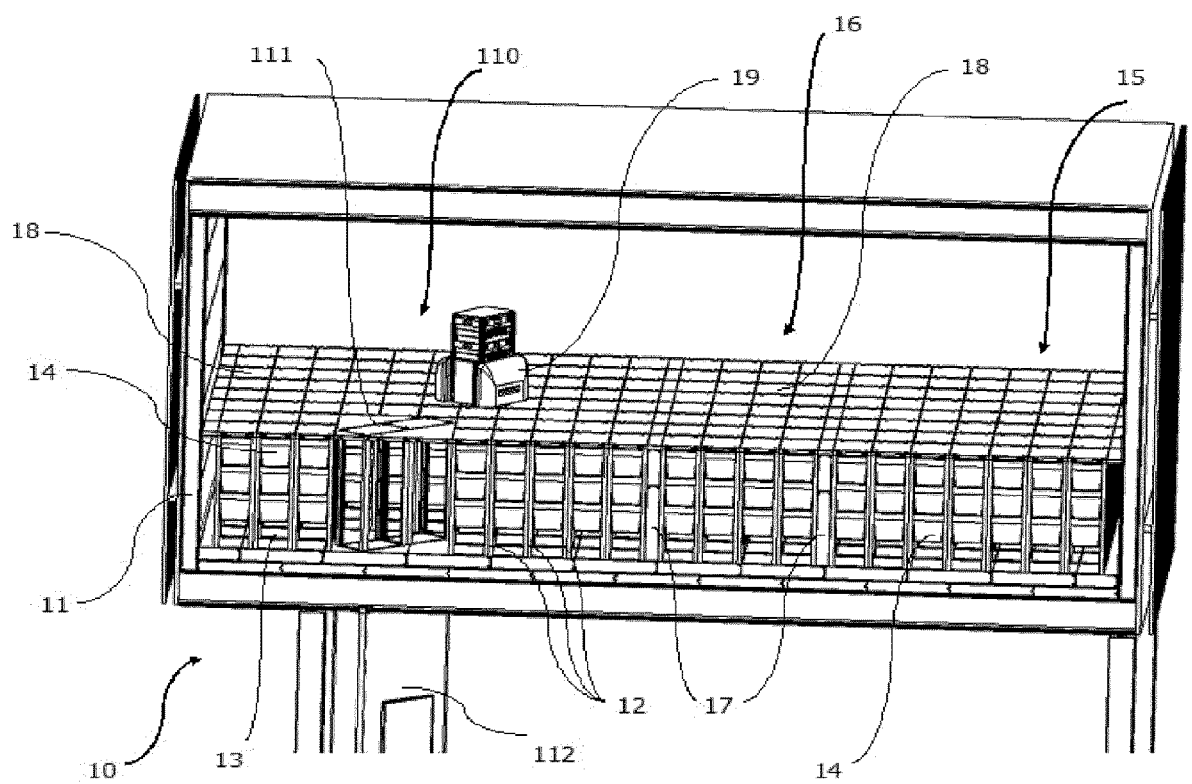
FIG. 1 is a perspective view of an example of an embodiment of a storage system according to the invention.

FIG. 1 illustrates, in a perspective view, an example of an automated storage system according to the invention implemented within a food storage warehouse.

This system 10 comprises a storage facility 11 formed by uprights 12 arranged in the plane of a grid, delimiting juxtaposed storage columns, or cells, 13 of rectangular cross-sections for storing bins 14 stacked on top of each other.

In this particular embodiment of the invention, the facility 11 is divided into three zones: a first zone 15 for keeping the contents of the bins cold, a second zone 16 for receiving bins containing frozen products and a third zone 110 for receiving bins that can be stored at the ambient temperature of the warehouse.

Vertical dividing walls 17 of thermally insulating material extending over the entire height of the columns are mounted between the first 15 and the second zone 16 and between the second and the third zone 110. In addition, the outer edges of the first zone 15 are covered with a protective thermal insulation layer.

Above the columns of the first 15, second 16 and third 110 zones, covers 18 are pivotally mounted, which are substantially contiguous with each other and allow the top opening of the columns 13 to be closed. When tilted flat, these covers 18 rest on horizontal beams and crosspieces connecting the upper ends of the uprights 12 in the longitudinal and transverse directions and form a rolling platform for selfguided two-wheel drive robots 19 for transporting the bins and for depositing or picking up one or more bins from a column. The covers 18 have a layer of thermal insulation to limit the loss of cold between the first zone 15 and the circulation space of the robots 19, and to limit the loss of cold between the second zone 16 and the circulation space of the robots 19, and to allow the robots to operate at the ambient temperature of the warehouse.

Figure 2:
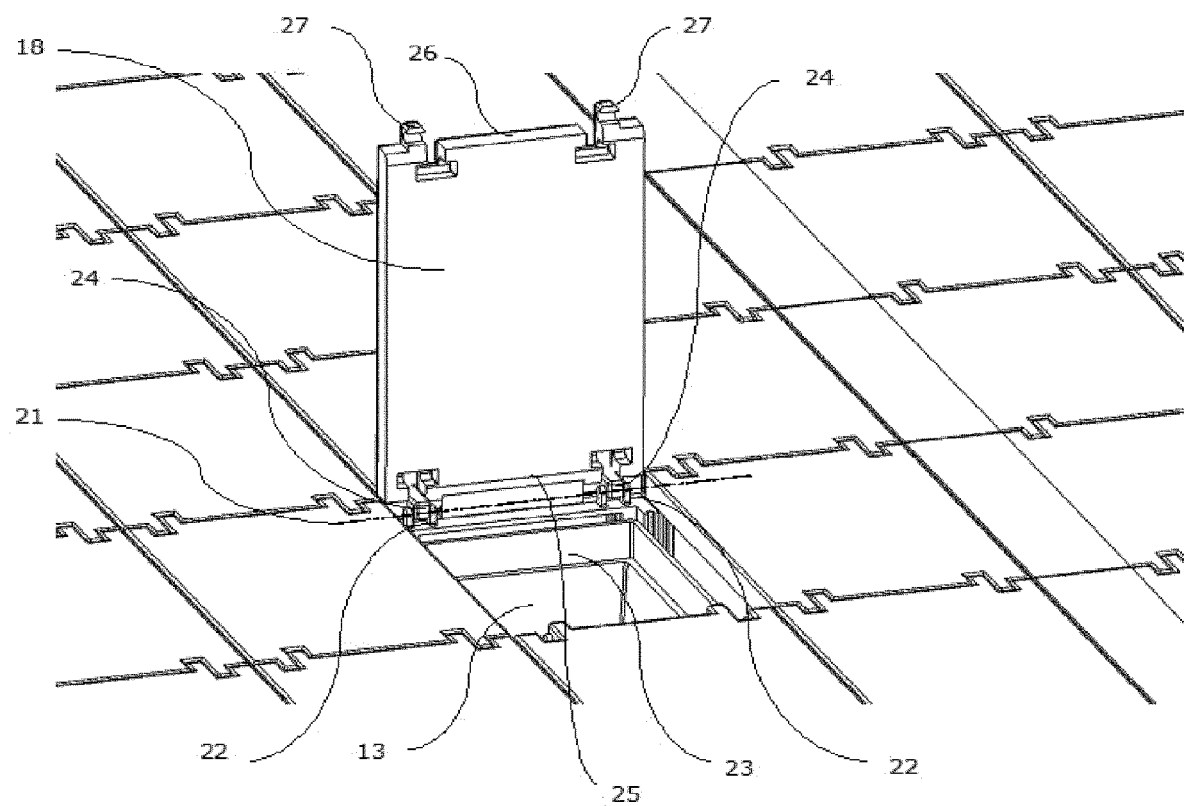
FIG. 2 is a detail view of a cover of the storage system shown in reference to FIG. 1, in the upright position.
Figure 3:
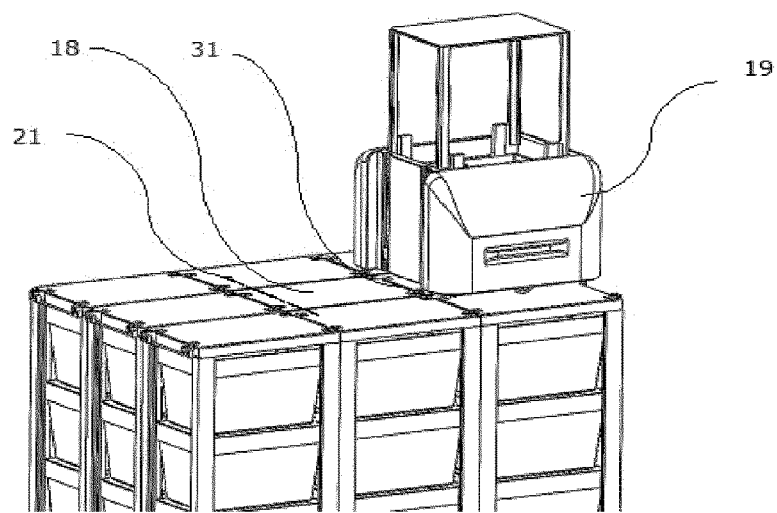
FIG. 3 illustrates a step of picking a stack of bins by a robot of the system shown with reference to FIG. 1, in which the robot positions itself opposite the cover to be lifted to pick the stack of bins.
Figure 4:
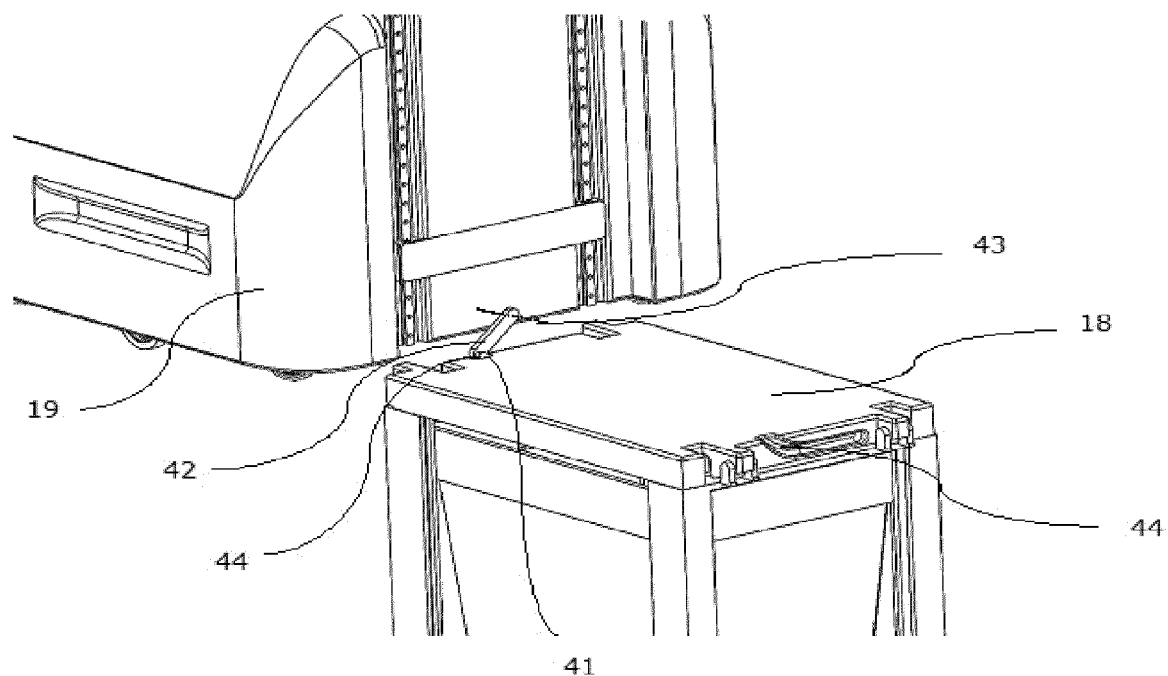
FIG. 4 illustrates a step in picking up a stack of bins by a robot of the system shown in FIG. 1, in which the robot engages a finger in the cover to lift it.
Figure 5:
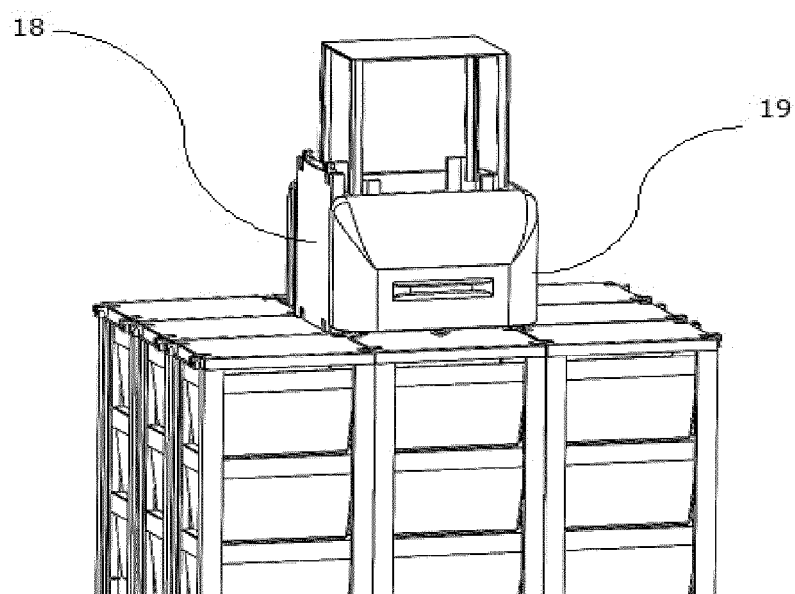
FIG. 5 illustrates a step in picking up a stack of bins by a robot of the system shown in FIG. 1, in which the robot completes pushing on the underside of the cover to tilt it upwards.

As can be seen in FIG. 2, in a detail view of a vertically tilted cover 18 to allow access to the bins stored in a column 13, this cover 18 can pivot around a horizontal axis 21 (shown in dotted lines in FIG. 2), formed by two axis portions 22 fixed to a crosspiece 23 defining the upper contour of the column 13. The cover 18 is articulated to the shaft portions 22 by means of a first pair of hooks 24 formed on a transverse edge 25 of the cover 18. In this particular embodiment of the invention, the cover 18 is configured to be pivotable upwards from either of its two transverse edges 25 and 26. To this end, a second pair of hooks 27 is formed on the transverse edge 26 of the cover 18.

FIGS. 3 to 6 show the various operations that enable a robot to pick up a stack of bins from a column.

In a first step (see FIG. 3), the robot faces the cover 18 covering the column, perpendicularly to the rotation axis of the cover 21 around which the robot 19 will tilt the cover 18 and close to the transverse edge 31 of the cover 18 furthest from the axis 21. The robot then introduces a finger 41 mounted at the free end of an arm 42 pivoting about a horizontal axis 43 into a blind groove 44 formed on one edge of the cover (see FIG. 4), which gradually lifts the cover. It should be noted that during this step, the robot 19 moves forward slowly to hold the finger lodged in the groove 44. When the arm 42 is sufficiently pivoted upwards, and in this case extends substantially vertically in this particular embodiment of the invention, which corresponds to a position of the cover 18 in which the latter is tilted by approximately 12° with respect to the horizontal, the chassis of the robot 19 comes into abutment against the underside of the hooks 24 of the cover. It is then sufficient for the robot 19 to push on the hooks 24 of the cover 18 to make it tilt upwards, while releasing the finger 41 from the groove 44, until the cover 18 reaches the vertical position shown in FIG. 5. It should be noted that in this particular embodiment of the invention, the finger 41 advantageously has a substantially spherical shape, which makes it possible to easily release the finger 41 from the groove 44. It should also be noted that in this particular embodiment of the invention, the chassis of the robot 19 has two vertical guiding slides, in the bottom of which the inner face of the hooks 24 comes to rest when the robot 19 pushes on the cover 18.

Figure 6:
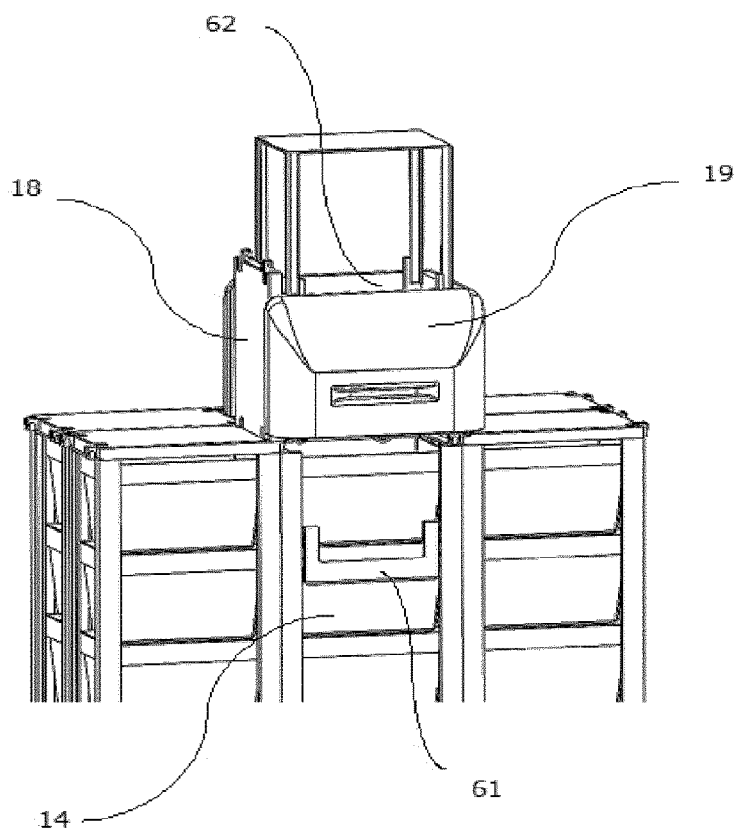
FIG. 6 illustrates a step of picking a stack of bins by a robot of the system shown with reference to FIG. 1, in which the robot is positioned above a column and actuates the sliding of a frame downwards around the stack in order to pick the stack of bins.

As can be seen in FIG. 6, the robot 19, which is then positioned above the column 13, then activates the descent of a frame, formed by two vertical plates 61 which slide along two opposite side faces of the bins 14 until they reach the level of the lower container of the stack of bins to be picked up, where hooks (not shown in FIG. 6) suspended from the plates 61 can slide into lugs formed on the edges of the lower container. The robot 19 then lifts the frame, which carries the stack of bins 14 with it, up to the level of the robot traffic area, above the covers 18. It should be noted that a central opening 62 is provided in the robot frame to allow the bins 14 to pass through the robot 19 frame.

The robot 19 then moves back to rest the cover 18 on the grid cell and then moves to a new column 13 where it has to deposit the stack of bins 14 or to a deposit column 111 provided in the third zone 110, where the stack of bins 14 is lowered by actuating the movement of the frame and deposited on a lift 112 located at the base of the deposit column 111.

FIGS. 7 to 10 illustrate different positions occupied by a cover of a second example of a storage system according to the invention, when it is pushed by a robot (not shown in FIGS. 7 to 10) by means of an arm of the robot, in order to free access to the column 72 which it enables to close.

Figure 7:
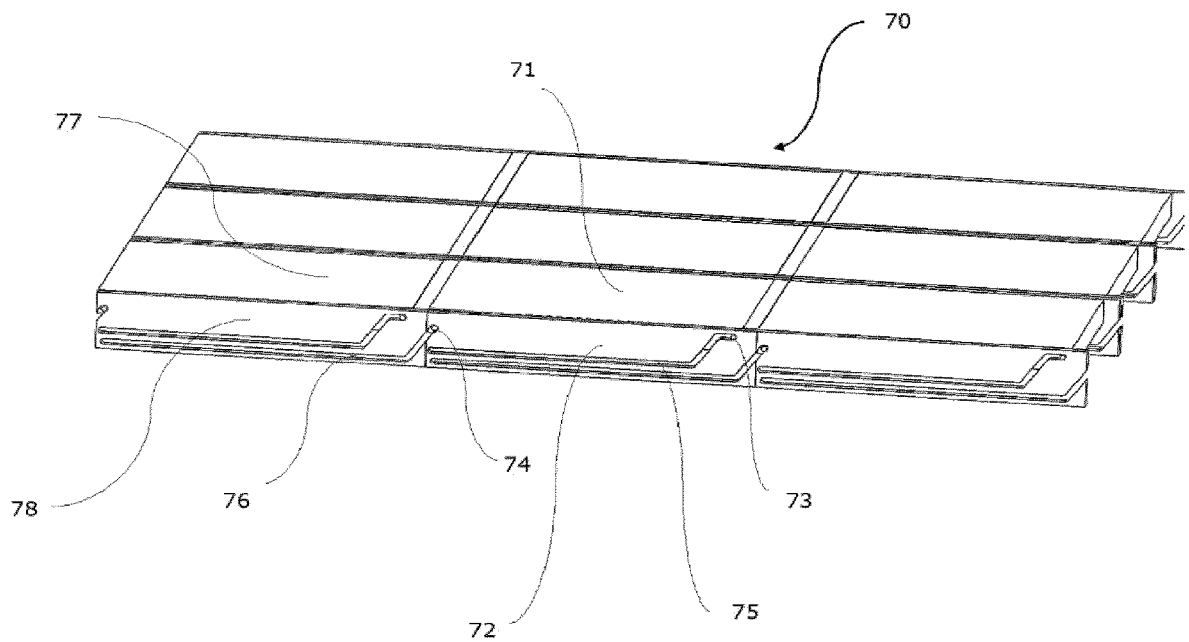
FIG. 7 is a partial view of a robot circulation platform of another example of an embodiment of a storage system of the invention, in which all the covers close off columns.
Figure 8:
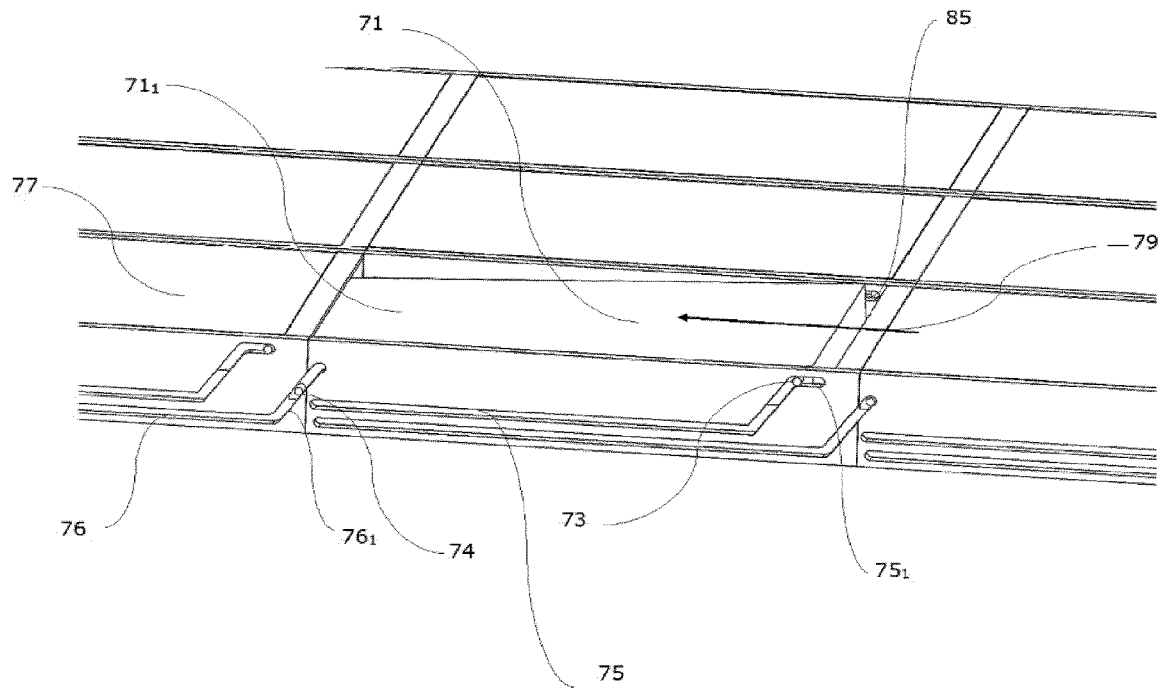
FIG. 8 is a detail view of the platform shown with reference to FIG. 7, when the front of one of the covers is tilted downwards by a robot to be able to slide it under the cover in front of it.

In FIG. 7, the cover 71 is in place on the column 72, which it seals, and its top surface is flush with the surface of the platform 70.

As can be seen in FIG. 7, the cover 71 has two projecting fingers 73 and 74 on its left longitudinal edge. Similar fingers project from the right longitudinal edge of the cover 71. The finger 74 is in this particular embodiment of the invention formed below the level of the finger 73.

These fingers 73 and 74 are housed in guiding slides 75 and 76 with which they cooperate. These guiding slides 75 and 76 are formed respectively on the left longitudinal edge of the column 72 and on the left longitudinal edge of the column 78 adjacent to the column 72 and closed by the cover 77. Similarly shaped slides 85 and 86, visible in FIG. 9, are also provided opposite each other on the opposite longitudinal edge of column 72, to guide the projecting fingers on the right longitudinal edge of cover 71.

These slides 75, 76, 85 and 86 are formed of different successive straight, horizontal or inclined portions.

When a robot pushes the cover 71 in the direction of the arrow 79 (see FIG. 8), the finger 73 slides first in the first horizontal part $75_1$ of the slide 75 while the finger 74 slides in the inclined part $76_1$ of the slide 76, which causes the front part $71_1$ of the cover 71 to gradually tilt downwards as the cover slides in the direction of the arrow 79.

Figure 9:
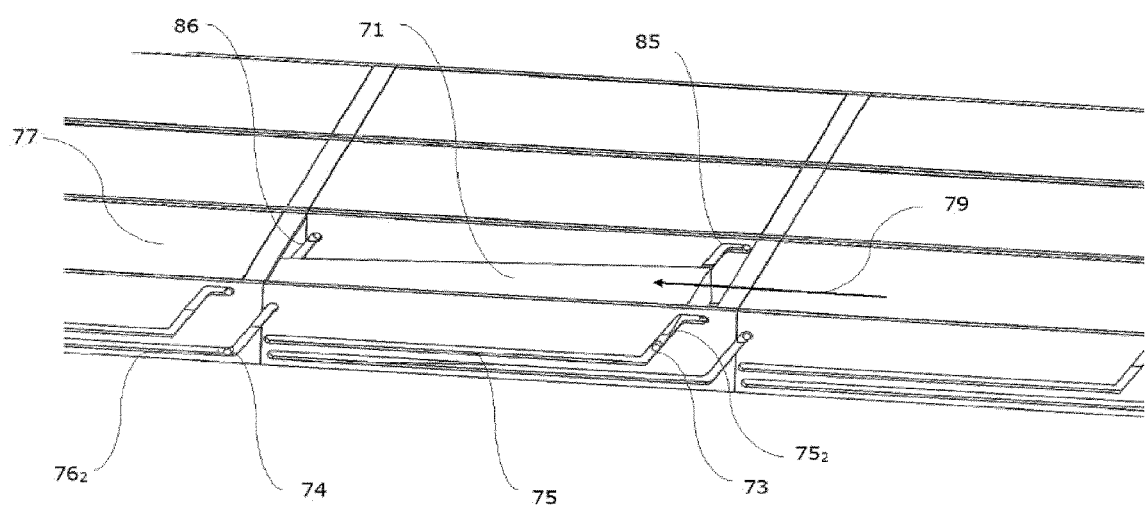
FIG. 9 is a view of the platform shown with reference to FIGS. 7 and 8, as the cover begins to slide under the cover in front of it.
Figure 10:
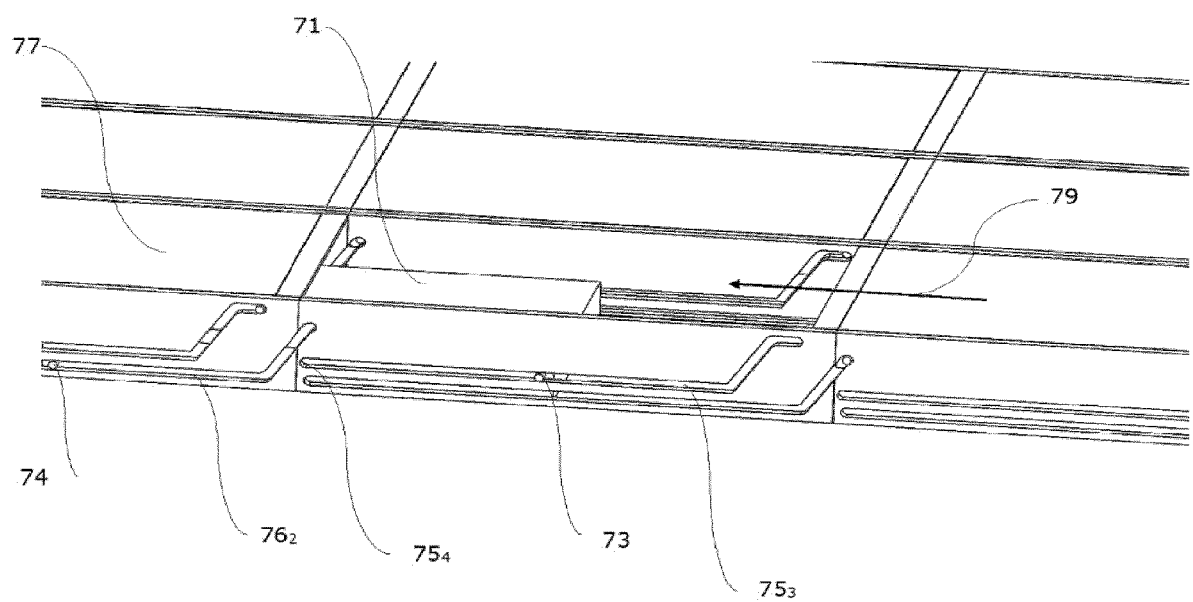
FIG. 10 is a view of the platform shown with reference to FIGS. 7 and 9, when the cover slides flat under the cover in front of it.

It can be seen in FIG. 9 that the finger 73 then progresses guided in an inclined portion $75_2$ of the slide 75 while the finger 74 continues to slide in the inclined portion $76_1$ before entering and progressing in the horizontal portion $76_2$ of the slide 76.

When the finger 73 reaches the low point of the inclined portion $75_2$, it enters the second horizontal portion $75_3$ of the slide 75 and the cover 71 can then slide horizontally under the adjacent cover 72 (see FIG. 10), until the finger 73 abuts the blind bottom $75_4$ of the horizontal portion $75_3$.

It should be noted that in this particular embodiment of the invention, the difference in height between the high and low points of the slide 75 or 76 is greater than the thickness of the cover 72, to allow the cover 71 to slide under it.

An exemplary embodiment of the present disclosure aims to overcome the above-mentioned shortcomings of the state of the art.

More specifically, an exemplary embodiment provides a technique that allows quick and easy removal of bins.

An exemplary embodiment provides such a technique that limits the heating of the products stored in the bins during their handling.

An exemplary embodiment provides such a technique which is simple to implement, and of low cost.

In particular, an exemplary embodiment provides a storage technique that allows products to be stored at different temperatures in the same facility.

An exemplary embodiment provides such a technique that is reliable.

Although the present disclosure has been described with reference to one or more examples, workers skilled in the art will recognize that changes may be made in form and detail without departing from the scope of the disclosure and/or the appended claims.

The invention claimed is:

1. A bin storage system comprising:
a plurality of storage columns of substantially rectangular cross-section, said columns being configured to receive a vertical stack of bins, upper contours of said storage columns forming a grid; and
at least one robot, which operates above said grid and is capable of picking up, transporting and depositing bins, said robot comprising:
at least one gripping and lifting element to grip and lift at least one bin; and
wheels; and
a plurality of removable covers above said grid, each being substantially contiguous with at least one other of the covers adjacent thereto and the covers extending substantially over an entire surface of a cell of said grid and said covers forming a circulation platform for said robot, wherein said robot comprises a pushing or pulling element to push or pull said covers enabling said covers to be changed in position to free access to an upper part of said columns,
wherein at least one of said covers is slidably mounted between a first position in which the cover closes off a top of a respective column of the plurality of storage columns and a second position, in which said cover is housed under another of the covers adjacent thereto in said first position, thereby freeing access to the top of that column.

2. The bin storage system according to claim 1 wherein said slidable cover has first and second pairs of laterally projecting fingers and the system comprises a first pair of finger guiding slides of said first pair of fingers extending on opposite edges of the column closed by said slidable cover in said first position and a second pair of finger guiding slides of said second pair of fingers extending on opposite edges of an adjacent column of said column closed by said sliding cover in said first position, located in an extension of said first pair of slides.

3. The bin storage system according to claim 1, wherein said covers have a layer of thermal insulation and said storage columns located under said covers are temperature controlled volumes.

4. The bin storage system according to claim 3, wherein at least two of said storage columns are at different controlled temperatures.

5. The bin storage system according to claim 1, wherein the pushing or pulling element comprises a finger adapted to cooperate with a housing formed in one of said covers.

6. The bin storage system according to claim 1, wherein the wheels of said robot comprise at least two driving wheels.

7. The bin storage system according to claim 1, wherein the gripping and lifting element comprises a frame capable of sliding around said bins and securing to a bin and comprises an element to vertically move said frame under the chassis of said robot.

8. The bin storage system according to claim 1, wherein the system comprises at least one deposit column for depositing said bins.

9. The bin storage system according to claim 1, comprising a first pair and a second pair of parallel rails or guiding slides formed in an upper portion of said cover, the second pair of parallel rails or guiding slides being perpendicular to the first pair of rails or guiding slides, and wherein the wheels of said robot are capable of running on rails or guiding slides and each wheel runs on either of said pairs of rails or guiding slides.

10. A bin storage system comprising:
a plurality of storage columns of substantially rectangular cross-section, said columns being configured to receive a vertical stack of bins, upper contours of said storage columns forming a grid; and
at least one robot, which operates above said grid and is capable of picking up, transporting and depositing bins, said robot comprising:
at least one gripping and lifting element to grip and lift at least one bin; and
wheels;
a plurality of removable covers above said grid, each being substantially contiguous with at least one other of the covers adjacent thereto and the covers extending substantially over an entire surface of a cell of said grid and said covers forming a circulation platform for said robot, wherein said robot comprises a pushing or pulling element to push or pull said covers enabling said covers to be changed in position to free access to an upper part of said columns; and
a first pair and a second pair of parallel rails or guiding slides formed in an upper portion of said cover, the second pair of parallel rails or guiding slides being perpendicular to the first pair of rails or guiding slides, and wherein the wheels of said robot are capable of running on rails or guiding slides and each wheel runs on either of said pairs of rails or guiding slides.

11. The bin storage system according to claim 10, wherein each of said covers is pivotally mounted along a horizontal axis between a horizontal position in which the cover closes off the upper part of a respective column of the plurality of storage columns and a vertical position in which access to the upper part of the column is released, and wherein said pushing or pulling element is adapted to push a free end of the cover to cause the cover to tilt upwards.

12. The bin system according to claim 11, wherein said covers are pivotally mounted along two parallel horizontal axes extending substantially at two opposite edges of said cover.

13. The bin storage system according to claim 10, wherein at least one of said covers is slidably mounted between a first position in which the cover closes off a top of a respective column of the plurality of storage columns and a second position, in which said cover is housed under another of the covers adjacent thereto in said first position, thereby freeing access to the top of that column.

14. The system according to claim 13 wherein said slidable cover has first and second pairs of laterally projecting fingers and the system comprises a first pair of finger guiding slides of said first pair of fingers extending on opposite edges of the column closed by said slidable cover in said first position and a second pair of finger guiding slides of said second pair of fingers extending on opposite edges of an adjacent column of said column closed by said sliding cover in said first position, located in an extension of said first pair of slides.

15. The system according to claim 10, wherein said covers have a layer of thermal insulation and said storage columns located under said covers are temperature controlled volumes.

16. The system according to claim 15, wherein at least two of said storage columns are at different controlled temperatures.

17. The system according to claim 10, wherein the pushing or pulling element comprises a finger adapted to cooperate with a housing formed in one of said covers.

18. The system according to claim 10, wherein the pushing or pulling element comprises a member projecting from a chassis of said robot for engaging an underside of the cover and pushing the cover to pivot upwards to said vertical position.

19. The system according to claim 10, wherein the wheels of said robot comprise at least two driving wheels.

20. The system according to claim 10, wherein the gripping and lifting element comprises a frame capable of sliding around said bins and securing to a bin and comprises an element to vertically move said frame under the chassis of said robot.

21. The system according to claim 10, wherein the system comprises at least one deposit column for depositing said bins.

22. A bin storage system comprising:
a plurality of storage columns of substantially rectangular cross-section, said columns being configured to receive a vertical stack of bins, upper contours of said storage columns forming a grid; and
at least one robot, which operates above said grid and is capable of picking up, transporting and depositing bins, said robot comprising:
at least one gripping and lifting element to grip and lift at least one bin; and
wheels; and
a plurality of removable covers above said grid, each being substantially contiguous with at least one other of the covers adjacent thereto and the covers extending substantially over an entire surface of a cell of said grid and said covers forming a circulation platform for said robot,
wherein said robot comprises a pushing or pulling element to push or pull said covers enabling said covers to be changed in position to free access to an upper part of said columns,
wherein each of said covers is pivotally mounted along a horizontal axis between a horizontal position in which the cover closes off the upper part of a respective column of the plurality of storage columns and a vertical position in which access to the upper part of the column is released, and
wherein said pushing or pulling element is adapted to push a free end of the cover to cause the cover to tilt upwards, wherein the pushing or pulling element comprises a member projecting from a chassis of said robot for engaging an underside of the cover and pushing the cover to pivot upwards to said vertical position.

23. The system according to claim 22, wherein said covers are pivotally mounted along two parallel horizontal axes extending substantially at two opposite edges of said cover.

24. The system according to claim 22, wherein said covers have a layer of thermal insulation and said storage columns located under said covers are temperature controlled volumes.

25. The system according to claim 24, wherein at least two of said storage columns are at different controlled temperatures.

26. The system according to claim 22, wherein the pushing or pulling element comprises a finger adapted to cooperate with a housing formed in one of said covers.

27. The system according to claim 22, wherein the wheels of said robot comprise at least two driving wheels.

28. The system according to claim 22, wherein the gripping and lifting element comprises a frame capable of sliding around said bins and securing to a bin and comprises an element to vertically move said frame under the chassis of said robot.

29. The system according to claim 22, wherein the system comprises at least one deposit column for depositing said bins.

30. The system according to claim 22, comprising a first pair and a second pair of parallel rails or guiding slides formed in an upper portion of said cover, the second pair of parallel rails or guiding slides being perpendicular to the first pair of rails or guiding slides, and wherein the wheels of said robot are capable of running on rails or guiding slides and each wheel runs on either of said pairs of rails or guiding slides.

* * * * *